Aug. 16, 1966  W. J. ENGSTROM  3,266,817
TRACTOR COUPLING MEANS
Filed Oct. 15, 1963  4 Sheets-Sheet 1
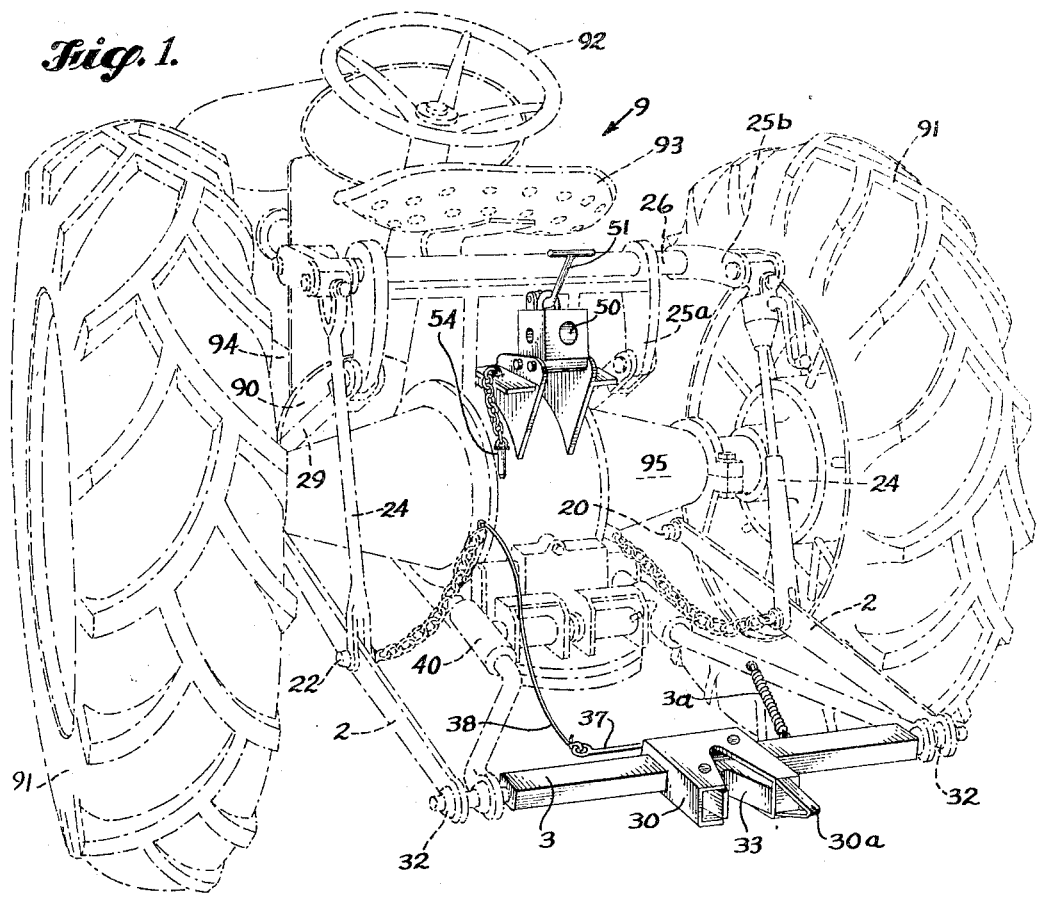
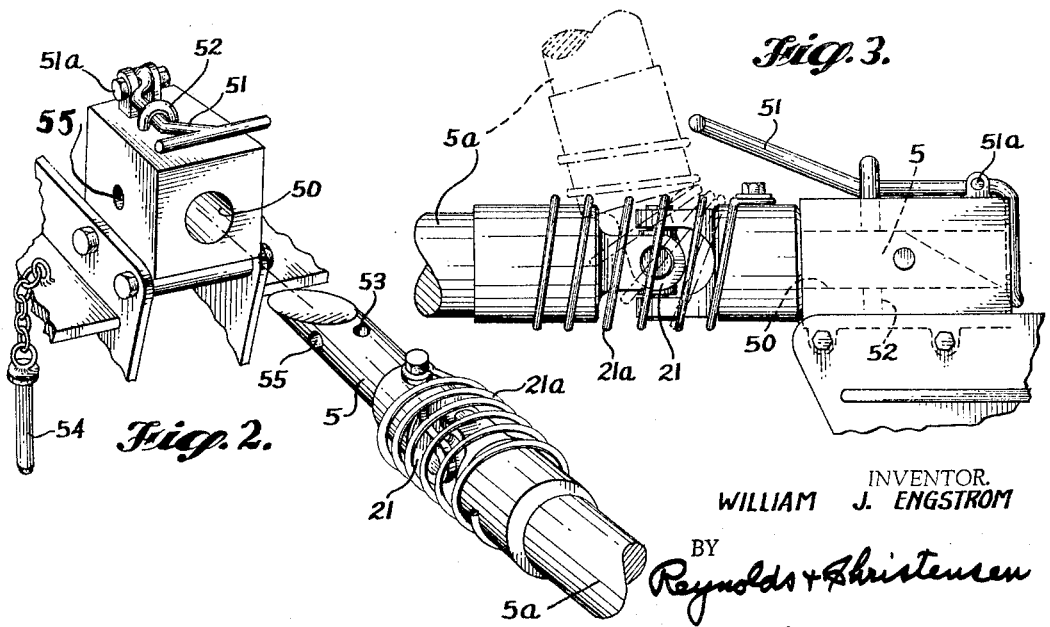
INVENTOR.
WILLIAM J. ENGSTROM
BY Reynolds + Christensen
ATTORNEYS Aug. 16, 1966 W. J. ENGSTROM 3,266,817
TRACTOR COUPLING MEANS
Filed Oct. 15, 1963 4 Sheets-Sheet 2

INVENTOR.
WILLIAM J. ENGSTROM
BY
Reynolds & Christensen
ATTORNEYS

Aug. 16, 1966 W. J. ENGSTROM 3,266,817
TRACTOR COUPLING MEANS
Filed Oct. 15, 1963 4 Sheets-Sheet 3
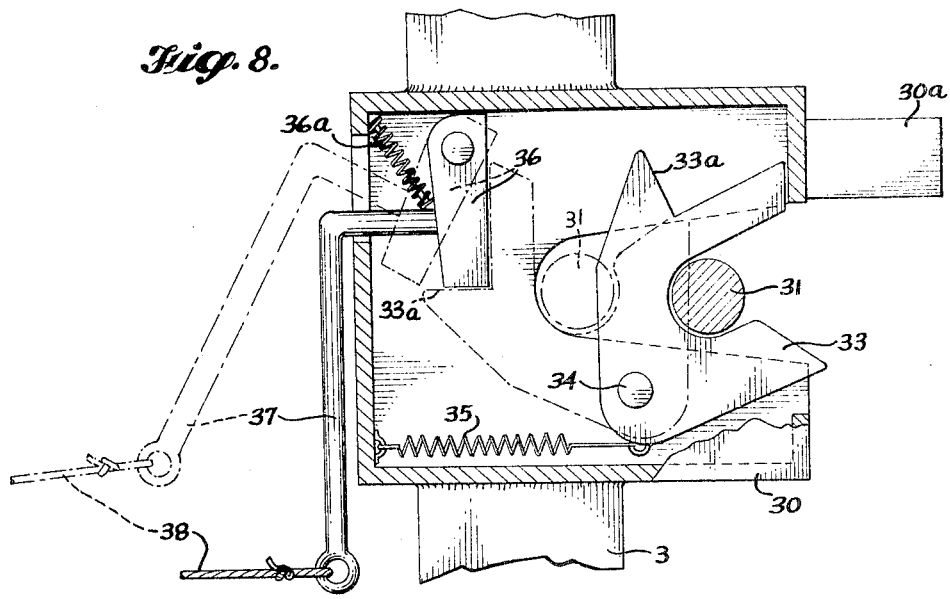
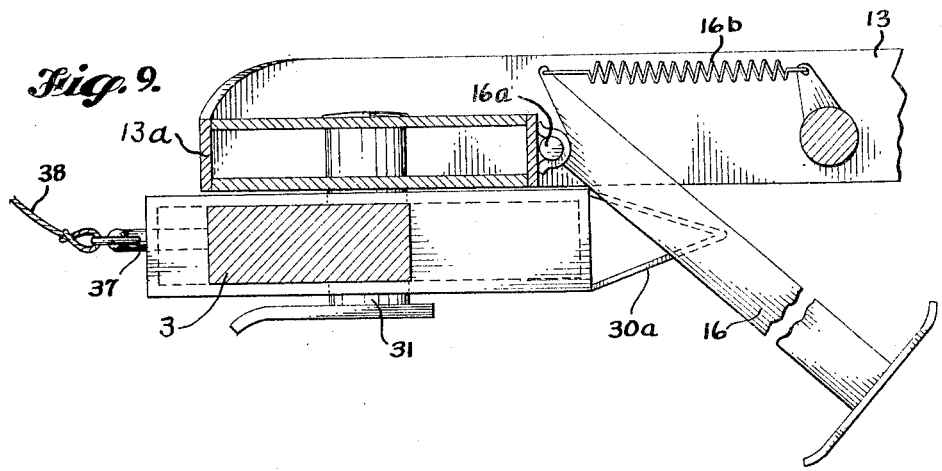
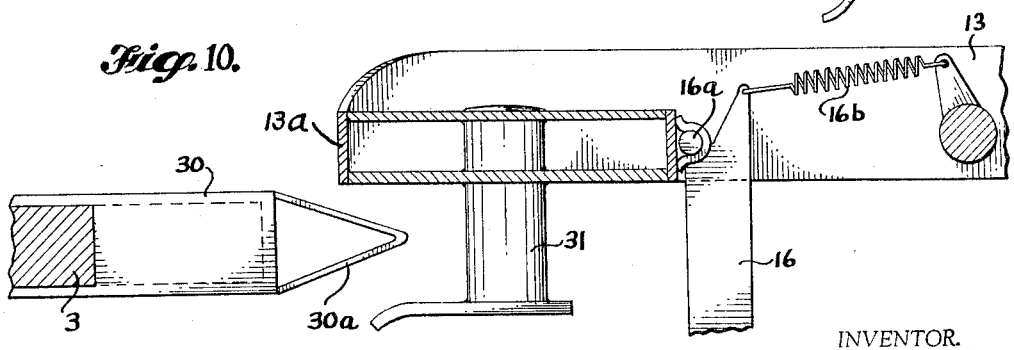
INVENTOR.
WILLIAM J. ENGSTROM
BY
Reynolds & Christensen
ATTORNEYS

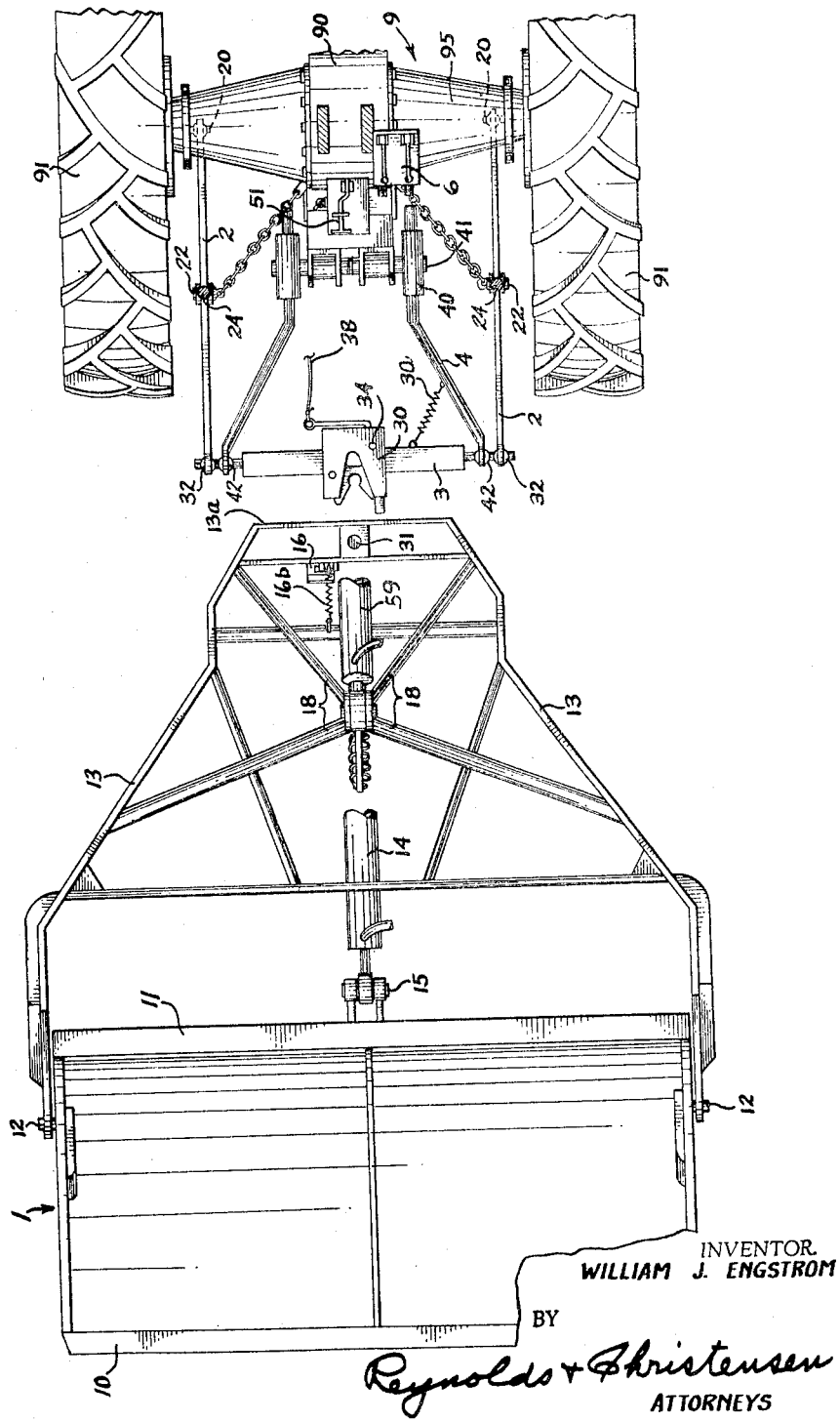

United States Patent Office 3,266,817
Patented August 16, 1966

3,266,817
TRACTOR COUPLING MEANS
William J. Engstrom, 5608 E. Mount Tacoma Drive,
Puyallup, Wash.
Filed Oct. 15, 1963, Ser. No. 316,393
7 Claims. (Cl. 280—461)

This invention pertains to quickly connectible and disconnectible coupling mechanism whereby a scoop or other implement can be coupled at two positions widely spaced vertically, to a tractor, so that the scoop, if that is the implement connected, can be lifted and lowered to any of various elevations, and dumped, without danger of the load toppling it onto the operator. This application concerns the coupler elements, and is disclosed in connection with a tractor-mounted scoop such as constitutes the subject of my companion application, Serial No. 316,222, filed October 15, 1963.

Such equipment will be found especially useful on a farm, for the scoop can be used to clean out a barn, to dump manure into a manure spreader or into a truck, or as a scraper or leveler, as described more fully in the companion application referred to. There are many other pieces of equipment upon a farm that desirably are mounted upon and powered from a tractor, or connected thereto; for instance, a loaded manure spreader must be hauled about a field to spread the manure, or a posthole auger must be employed to dig holes for fence posts at spaced locations. For these reasons it is highly desirable that a given tractor be readily and quickly connectible to and disconnectible from any such individual piece of equipment. It is a primary object of this invention to provide coupling mechanism useful with any such piece of equipment, and especially with a scoop of the nature disclosed in the companion application, capable of enabling such ready connection and disconnection. This coupling mechanism, although it includes but two coupler pairs, affords the equivalent of a three-point connection, whereby the supported equipment is stable and well-braced.

More particularly, it is an object to provide coupler means, one part whereof is mounted permanently upon the tractor for raising or lowering, and the complemental part whereof is a part of the scoop or other piece of individual equipment, so arranged as to be connectible and automatically locked securely in connected relation, by movement of the tractor relative to the equipment, yet readily disconnectible at will by release mechanism operable from the tractor-operator's seat and by opposite movement of the tractor.

In equipment which requires two couplers, one usually positioned above the other (as is the case in the scoop of the companion application), it is a further object to provide such a second or upper coupler, in addition to the coupler just described, which incorporates tractor-mounted and equipment-mounted coupler elements equally readily connectible and disconnectible from the operator's seat, and also securely engaged, by like movement relatively of the tractor and the equipment.

It is also an object to provide such coupler elements of simple yet rugged construction, each coupler as a whole being sufficiently flexibly mounted as to afford adequate freedom of movement between the tractor and the equipment to accommodate expected irregularities of the ground, yet sufficiently rigid as to enable effective reaction of forces between the tractor and the equipment for operation of the equipment.

A further object concerns the positioning and relative location of the complemental coupler elements for ready inter-engagement when the equipment is to be coupled.

With these and other objects in mind, as will appear more fully hereinafter, my invention comprises the novel coupler mechanism shown in a preferred form in the accompanying drawings, and as will be described hereinafter, and the novel features of the same will be defined in the accompanying claims.

FIGURE 1 is a perspective view of the rear end of a tractor, from which the operating equipment has been uncoupled, showing the lifting and draft mechanisms and the tractor-mounted coupler elements ready for recoupling.

FIGURE 2 is a perspective view of the two parts of the upper coupler in position for reengagement, and FIGURE 3 is a side elevational view showing them engaged.

FIGURE 8 is a plan view of the same (with cover removed), showing parts reengaged but not yet locked; and FIGURE 9 is a longitudinal vertical sectional view, showing the parts fully engaged.

FIGURE 10 is a view similar to FIGURE 9, but with parts in the relative positions shown in FIGURE 7.

FIGURE 11 is a plan view of the rear end of the tractor and of the entire scoop, in relative positions for recoupling.

Figure 5:
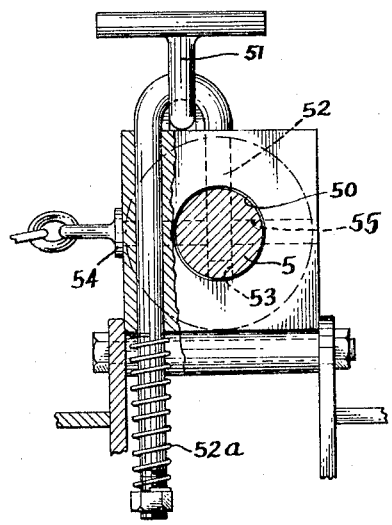
FIGURE 5 is a cross-sectional view of the same, at the line 5—5 of FIGURE 4.
Figure 4:
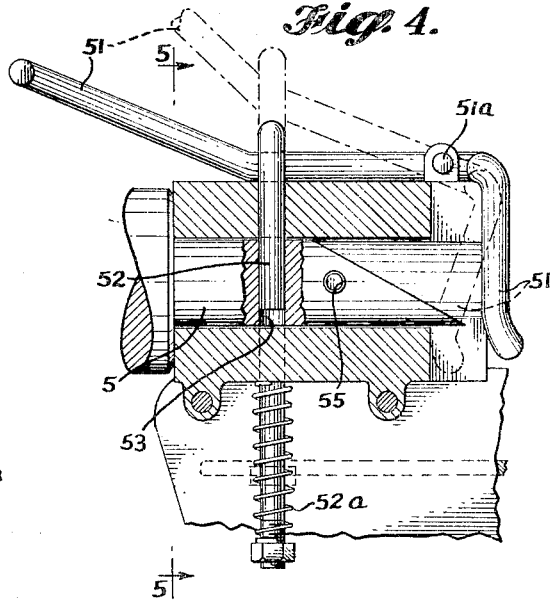
FIGURE 4 is a vertical sectional view of the upper coupler, with parts interengaged, taken at the line 4—4 of FIGURE 6.
Figure 6:
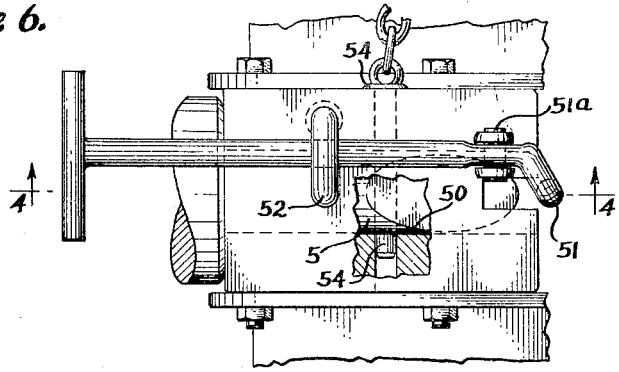
FIGURE 6 is a plan view of the same, partly broken away.
Figure 7:
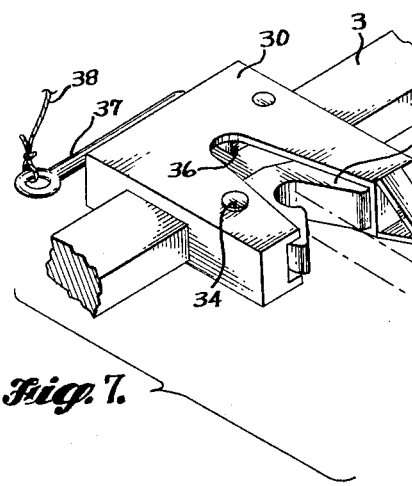
FIGURE 7 is a perspective view of the lower coupler, with parts in position for reengagement.

Although the details of the tractor and of the scoop or other equipment coupled thereto, aside from the couplers and associated mechanism, are not material to the present invention, and are shown for purposes of illustration, it will be helpful to an understanding of this invention to describe them briefly. The tractor 9, upon a chassis 90, is mounted upon rear driving wheels 91 driven from the engine 94, and upon front wheels (not shown) steerable by the operator seated at 93 through the steering wheel 92. The rear driving axle is within a housing at 95. Lifting arms 2 pivotally mounted at 20 upon the tractor and beneath the driving axle, extend rearwardly, and are joined by a transverse bar 3 pivotally joined at 32 to the swinging ends of the arms 2. These lifting arms are engaged at 22 by links 24, which depend from one arm 25b of a lever carried by rock shaft 26, the other arm 25a whereof is swingable by tractor-mounted jack means 29. The transverse bar 3 carries a coupler element 30, to be described in detail later, to which any piece of equipment can be coupled, if it has a coupler element complemental to the coupler element 30. Some sidewise and vertical movement of the arms 2 relative to the tractor is desirable to accommodate ground irregularities, but such movement must be limited. Accordingly, sway brace bars 4 that are connected at 42 to the transverse bar 3, are guided somewhat loosely in sleeves 40 each independently pivoted at 41 upon the tractor.

Assuming that a scoop such as is shown in the companion application is the piece of equipment that is to be mounted upon and controlled from the tractor, it can include extension arms 13 joined at their forward end by a bar 13a which when coupled abuts the bar 3, to prevent lateral movement of the scoop relative to bar 3. The scoop 1 is pivotally mounted at 12 to the rear ends of extension arms 13, whereby its blade 10 can be kept level, or can be upright. The back 11 of the scoop retains a scooped-up load. Disposition of the scoop about the pivot axis at 12 is controlled by a jack 14 reacting between the scoop at 15 and the forward end of arms 13. The complemental coupler element 31, an upright pin, is carried by the bar 13a. By this mechanism the scoop can be elevated from the tractor, yet is held against undue side sway relative thereto, when the two are coupled together. Of course, in order to lift extension arms 13 relative to lift arms 2, an upper coupler on the scoop, such as pin 5, receivable within sockets 50 upon the tractor, must also be coupled. When so coupled a jack 59 reacting between the tractor at 50 and a skeleton pyramidal structure 18 rising from the arms 13, accomplishes movement of the scoop about the pivot at 32. This second coupler will also be described more fully later.

By the mounting described, and the details whereof are shown in the companion application, the scoop can be lifted by action of either one or both of the jack means, to any necessary elevation, or can be lowered to scoop up a load as the tractor moves rearwardly. The attitude of the several parts of the mechanism is controllable through the several jacks.

But a scoop such as this is only one of many pieces of equipment that are desirably coupled to the tractor from time to time. For example, the scoop having been used to load a manure spreader, the loaded spreader must be hauled over a field to spread the manure, and the tractor can be used to haul it. It may be desired to couple a post-hole auger to the tractor, whereby to dig post holes at spaced locations. By uncoupling the tractor from one such piece of equipment, and coupling it by like means to another piece, the tractor's usefulness is multiplied, and expense to the farmer for self-powered equipment is avoided.

The lower coupler element at 30 is in effect a shell or housing incorporated in the bar 3, and notched at its rear edge for entry of the upright complemental pin 31. Within it a notched yoke or lever 33 is pivotally mounted at 34, and is held by a spring 35 in an open position wherein its notch coincides with the notch in the shell, as shown in full lines in FIGURE 8. In this open position the pin 31 can enter the notches, and will rotate the yoke 33, until a locking dog 36 is swung aside, and, being spring-urged at 36a to locking position, snaps back to engage shoulder 33a to lock the yoke 33 in locked position, across the notch in the shell 30. This blocks movement of yoke 33 into open position, and securely retains pin 31 coupled to the tractor. Pin 31 can readily be released, merely by swinging dog 36 away from shoulder 33a, by means such as the arm 37, integral with dog 36, and movable thus by a cord 38 positioned for operation by the tractor operator.

The bar 3 is held elevated at all times by jack means 29 somewhat above the ground, being held approximately level by spring 3a, and in order that 31 and 33 can be interengaged by backing the tractor the pin 31 must be held at a like elevation. This is readily effected by a leg 16 pivotally mounted at 16a upon the support for the pin 31, and urged by a spring 16b into upright supporting position. When the pin 31 approaches the yoke 33 a projection 30a upon the bar 3 engages the leg 16 and guides the pin into the notch in yoke 33. The leg strikes the shell 30, which swings the leg upwardly just as the two coupler elements engage to support one from the other; compare FIGURES 10 and 9. Whenever the coupler is released, the leg 16 swings downwardly again to support the scoop element 31 at the proper level for recoupling.

The upper coupling, as already stated, includes a pin 5 receivable within a socket 50. It is not material which of these is mounted upon the tractor, and which upon the scoop, but as shown the socket 50 is fixedly mounted upon the tractor, and the pin 5 is supported from the scoop to transmit thrust, although through a flexible universal joint at 21, with a surrounding spring 21a to maintain the pin 5 and its immediate support at 5a more or less in alignment when unstressed. The pin 5 is beveled at its entering end, and is of such length that when fully engaged it projects somewhat forwardly beyond the socket 50, or the forward end of the socket may be notched. The purpose is to permit a disengaging lever 51, pivotally mounted at 51a, to engage the end of pin 5 and to urge it from the socket, under the influence of an upward pull upon its rear end. First, however, the lock which secures the pin within its socket must be released. A lock pin 52, urged downwardly by spring 52a, rides upwardly on the beveled end of the entering pin 5, and drops into a recess 53 in the pin, securely retaining the parts coupled. The disengaging lever 51 is engaged with lock pin 52, and when swung upwardly it first lifts lock pin 52 from its recess, and then urges pin 5 lengthwise out of its socket. A further manual lock pin 54, receivable in a recess 55 of the pin 5, may be used to take the strain if the parts are to remain coupled during long-continued use, thereby relieving lock pin 52 from excessive wear.

Whenever a scoop or other equipment is to be coupled to the tractor, the tractor is backed towards the equipment. Leg 16 supports the coupler element 30 above ground level, and the complemental coupler element 31 is held at or moved to this level by means of jack means 29 until the two parts interengage, a little more closely than is shown in FIGURE 10. Controls for the jack means are at 6 (FIGURE 11). The shell 30 swings leg 16 upwardly, and finally pin 31 engages lever 33 and swings the latter into locked position, as shown in dot-dash lines in FIGURE 8. Next, assuming an upper coupling is required in addition, the pin 5 is guided into its socket 50, lifting the lock pin 52, to drop finally into its recess 53. The manual lock pin 54 may also be engaged, if desired. In a matter of seconds the scoop is securely mounted upon the tractor, and when the scoop is to be disengaged the lock pin 52 and the locking dog 36 are releasable, and the coupler elements disengaged by forward movement of the tractor, also in a matter of seconds. As the tractor moves away from the released equipment leg 16 swings downwardly, and again supports the coupler element 31 at the proper elevation for reengagement.

I claim as my invention:

1. Mechanism for coupling a liftable apparatus to a tractor, and for releasing the same, comprising an upper and a lower coupler, each including an element mounted upon the tractor and a complemental element mounted upon the liftable apparatus, one of said couplers including a pin vertically disposed and a complemental notched yoke to receive said pin, a notched lever pivotally mounted to swing from an open position with its notch registering with the notched yoke, to a closed position to bar withdrawal of said pin, and releasable means to lock the lever in its closed position, the other of said couplers including a horizontal and longitudinally disposed recess on one of the tractor or the apparatus, a pin on the other directed to enter said recess, and releasable means to lock said pin within the recess.

2. Mechanism for releasably coupling a liftable apparatus to a tractor comprising a lower two-part coupler, the two parts whereof are mounted respectively upon the tractor and upon the liftable apparatus, the tractor-mounted part including a first transverse bar braced against side sway and arranged for raising and lowering, and the apparatus-mounted part including a second transverse bar which abuts the first transverse bar when coupled thereto, coupling means carried by the respective bars, at a single point intermediate their ends, in position for interengagement by approach of the bars, said coupling means being complementally shaped to preclude material movement of one bar relative to the other with respect to that point, and to retain the bars in abutting relationship while they are interengaged, whereby the second bar is held by the first bar against side sway or relative rotation, and the mechanism further including a two-part upper coupler mounted independently of the two bars and the aforesaid coupling means, the two parts whereof are carried respectively by the tractor and by the liftable apparatus at a single point on each materially above the lowered position of the transverse bars, at least one of said two parts being flexibly mounted for ease of engagement with its complemental part.

3. Mechanism for releasably coupling a liftable apparatus to a tractor comprising a lower two-part coupler, the two parts whereof are mounted respectively upon the tractor and upon the liftable apparatus, the tractor-mounted part including a first transverse bar braced against side sway and arranged for raising and lowering, and the apparatus-mounted part including a second transverse bar which abuts the first transverse bar when coupled thereto, coupling means carried by the respective bars, at a single point intermediate their ends, in position for interengagement by approach of the bars, said coupling means being complementally shaped to preclude material movement of one bar relative to the other with respect to that point, and to retain the bars in abutting relationship while they are interengaged, whereby the second bar is held by the first bar against side sway or relative rotation, and the mechanism further including a two-part upper coupler, including a pin carried by and supported flexibly from one of the tractor or the liftable apparatus, at a single point materially above the lowered position of the transverse bars, and a pin-receiving recess carried by the other, directed longitudinally and positioned to receive the pin upon approach, and releasable locking means to retain the pin within the recess until release, to enable pull upon the liftable apparatus from the tractor.

4. Mechanism as in claim 3, wherein the recess is carried by the tractor, and the pin that fits therein is carried by the liftable apparatus, and is connected thereto by means of a universal joint.

5. Mechanism as in claim 3, including two sway bars directed longitudinally of the tractor and engageable with the opposite ends of the first transverse bar, and guide means directed longitudinally of the tractor and receiving the respective sway bars, to guide the same for limited longitudinal movement but restricting their lateral movement.

6. Mechanism as in claim 5, wherein said guide means are located inwardly of the outer ends of the sway bars, where the latter engage the transverse bar, and the sway bars are inclined outwardly from their guide-received ends to their outer ends.

7. Coupling mechanism as in claim 3, including means carried by the tractor for elevating and lowering said first transverse bar.

References Cited by the Examiner

UNITED STATES PATENTS

| 1,333,384 | 3/1920  | Buller       | 280—510   |
| 2,388,923 | 11/1945 | Masters      | 280—475   |
| 2,547,772 | 4/1951  | Peters       | 280—509   |
| 2,597,096 | 5/1952  | Harris       | 280—509   |
| 2,631,862 | 3/1953  | Johnson      | 280—475   |
| 2,685,453 | 8/1954  | Kuhary et al.| 280—479 X |
| 2,779,607 | 1/1957  | Milhizer     | 280—510   |
| 2,783,059 | 2/1957  | Hartl        | 280—509   |
| 2,793,880 | 5/1957  | Oehler et al.| 280—461   |
| 2,822,739 | 2/1958  | Altgelt      | 172—275   |
| 2,828,974 | 4/1958  | Jameson      | 280—510   |
| 2,935,145 | 5/1960  | Du Shane et al. | 172—275 |
| 3,020,066 | 2/1962  | Torrey       | 280—510   |
| 3,029,092 | 4/1962  | Stuart       | 280—477   |

LEO FRIAGLIA, *Primary Examiner.*

BENJAMIN HERSH, *Examiner.*

R. C. PODWIL, *Assistant Examiner.*